United States Patent [19]
Shaffer

[11] 3,835,408
[45] Sept. 10, 1974

[54] DC SIGNAL TRANSLATOR WITH A VARIABLE AMPLITUDE OSCILLATOR

[75] Inventor: William John Shaffer, Sumneytown, Pa.

[73] Assignee: Leeds & Northrup Company, North Wales, Pa.

[22] Filed: Aug. 3, 1973

[21] Appl. No.: 385,598

Related U.S. Application Data

[63] Continuation-in-part of Ser. No. 284,081, Aug. 28, 1972, abandoned.

[52] U.S. Cl. .................................. 330/10, 324/118
[51] Int. Cl. ............................................ H03f 3/38
[58] Field of Search ................ 330/10, 25; 324/118

[56] References Cited

UNITED STATES PATENTS 3,325,744 6/1967 Revesz et al. .................... 330/10 X

*Primary Examiner*—Herman Karl Saalbach
*Assistant Examiner*—James B. Mullins
*Attorney, Agent, or Firm*—Woodcock, Washburn, Kurtz & Mackiewicz

[57] ABSTRACT

A DC signal translator having an output DC isolated from the input comprises a variable amplitude oscillator generating an oscillating output signal having an amplitude directly related to the magnitude of the DC supply voltage for the oscillator. A DC isolating transformer is associated with the oscillator. A feedback rectifying circuit is coupled between the DC isolating transformer and the input of an amplifier so that the oscillator's DC supply voltage, and hence, AC amplitude, is continuously adjusted so as to maintain a portion of the rectified DC feedback signal very nearly equal to the input signal. An output rectifying circuit which is matched with the feedback rectifying circuit is coupled to the isolating transformer so as to produce a DC output signal corresponding to the DC input signal while maintaining DC isolation between the input and the output of the DC signal translator.

17 Claims, 5 Drawing Figures

DC SIGNAL TRANSLATOR WITH A VARIABLE AMPLITUDE OSCILLATOR

CROSS-REFERENCE TO RELATED APPLICATION

This is a continuation-in-part of application Ser. No. 284,081 filed Aug. 28, 1972, and now abandoned, incorporated herein by reference.

BACKGROUND OF THE INVENTION

This invention relates to DC signal translators of the type utilized in the precise measurement of control variables where the output is DC isolated from the input and the DC output signal closely corresponds to the DC input signal.

At least three different approaches have been utilized for isolated DC signal translators of this type. A first approach as exemplified by U.S. Pat. No. 2,901,563-McAdam et al. involves the use of a feedback signal which is directly related to the DC output signal obtained from the DC isolating transformer. The feedback signal is utilized to correct any deviation of the DC output signal from the DC input signal. A similar system is disclosed in U.S. Pat. No. 2,832,848-Neff wherein a DC feedback derived from the same output transformer as the DC output signal is utilized to any deviation in the DC output signal from the DC signal input. In general, systems of this type have relied upon precision feedback transformers and mechanical choppers. However, the precision required of the feedback transformer makes it very costly.

A second approach to DC signal translators of this type involves the use of a modulator-transformer-demodulator without feedback. Such a signal translator must be very carefully designed to maintain a faithful reproduction of the DC input signal and this of course results in increased costs. Furthermore, changes in ambient temperature can result in errors in the DC output due primarily to changes in transformer resistance.

Still a third approach disclosed in U.S. Pat. No. 3,226,639-McAdam et al. involves a magnetic amplifier where the magnetic flux of the input coil is balanced by the magnetic flux of an output which is in series with the load. If the input ampere-turns are not equal to the output ampere-turns, a magnetic flux is created, sensed and amplified so as to cause the output ampere-turns to balance the input ampere-turns. In general, systems of this type are expensive and sensitive to temperature changes which can produce a zero shift. A zero shift can also be produced as a result of a severe disturbance in the flux balance condition.

The prior art DC signal translators described in the foregoing are generally characterized by high power requirements. As a result, they involve the use of more than two wires in transmitting the DC output signal from a remote location to a central location and transmitting the power for the signal translator from the central location to the remote location. In most cases, two wires are utilized for transmission of the DC output signal and an additional two wires are utilized for transmission of AC power.

SUMMARY OF THE INVENTION

It is one object of this invention to provide a relatively low cost DC signal translator having a DC isolated input and output.

It is another object of this invention to provide a DC signal translator which is relatively insensitive to changes in temperature.

It is a further object of this invention to provide a DC signal translator which is relatively immune to zero shift.

It is a still further object of this invention to provide a DC signal translator which has a sufficiently low power requirement so as to permit the use of a two-wire transmission system consistent with industry-accepted signal levels.

In accordance with these and other objects, a preferred embodiment of the invention comprises a circuit for obtaining a DC output signal corresponding to a DC input signal where DC isolation is maintained between the input and the output of the circuit. The circuit comprises oscillator means including a transistor for generating an oscillating signal having an amplitude varying with a DC supply voltage for the oscillator means. A DC isolating transformer associated with the oscillator means includes an input winding DC coupled to the transistor and an output winding DC isolated from the transistor. The feedback means coupled to the input winding of the transformer means applies an oscillating signal to the feedback rectifying means which is DC coupled to the feedback means so as to produce a DC feedback signal related to the amplitude of the oscillating signal. The DC feedback signal and the DC input signal are applied to the input of an amplifier means to generate a signal at the output of the amplifier means related to the difference between the DC feedback signal and the DC input signal for use as the DC supply voltage of the oscillator. An output rectifying means coupled to the output winding of the transformer produces a DC output signal corresponding to the DC input signal.

In accordance with one preferred embodiment of the invention, the feedback means comprises a feedback winding which is DC isolated from the input winding and the output winding. This permits the feedback winding to be referenced to a potential which differs from the potentials of the supply voltages for the amplifier means. Where the supply voltages for the amplifier means are positive and negative and the feedback winding is referenced to an intermediate potential such as circuit common, the output of the amplifier may swing between the positive and negative potentials of the supply voltage so as to provide the oscillator with the largest possible voltage change. As a result, the transistor of the oscillator is made operable at a relatively high voltage and changes in the characteristics of the rectifying means with temperature and loading are not critical.

In accordance with another embodiment of the invention, the feedback means is DC coupled across a portion of the input winding from the isolation transformer such that the output winding and the input winding form part of the oscillator tank circuit.

In accordance with another important aspect of the invention, the DC output signal is applied to the input of an output amplifier means having output terminals connected is series relationship with a DC power supply means, a load means and a power supply isolator means utilizing a two-wire transmission means.

In accordance with still another important aspect of the invention, the output amplifier means amplifies the signal from and is powered by the output rectifying means. This is accomplished by providing an operational amplifier means having a pair of input terminals, an output terminal and at least one power supply terminal. Amplifier input means apply one portion of the output signal from the output rectifying means to one of the input terminals of the operational amplifier means and provides another portion of the output signal to the at least one power supply terminal. Amplifier output means are provided for coupling the output terminals to the load means and amplifier feedback means are provided for coupling the load means to one of the input terminals.

DETAILED DESCRIPTION OF A PREFERRED EMBODIMENT

Figure 1:
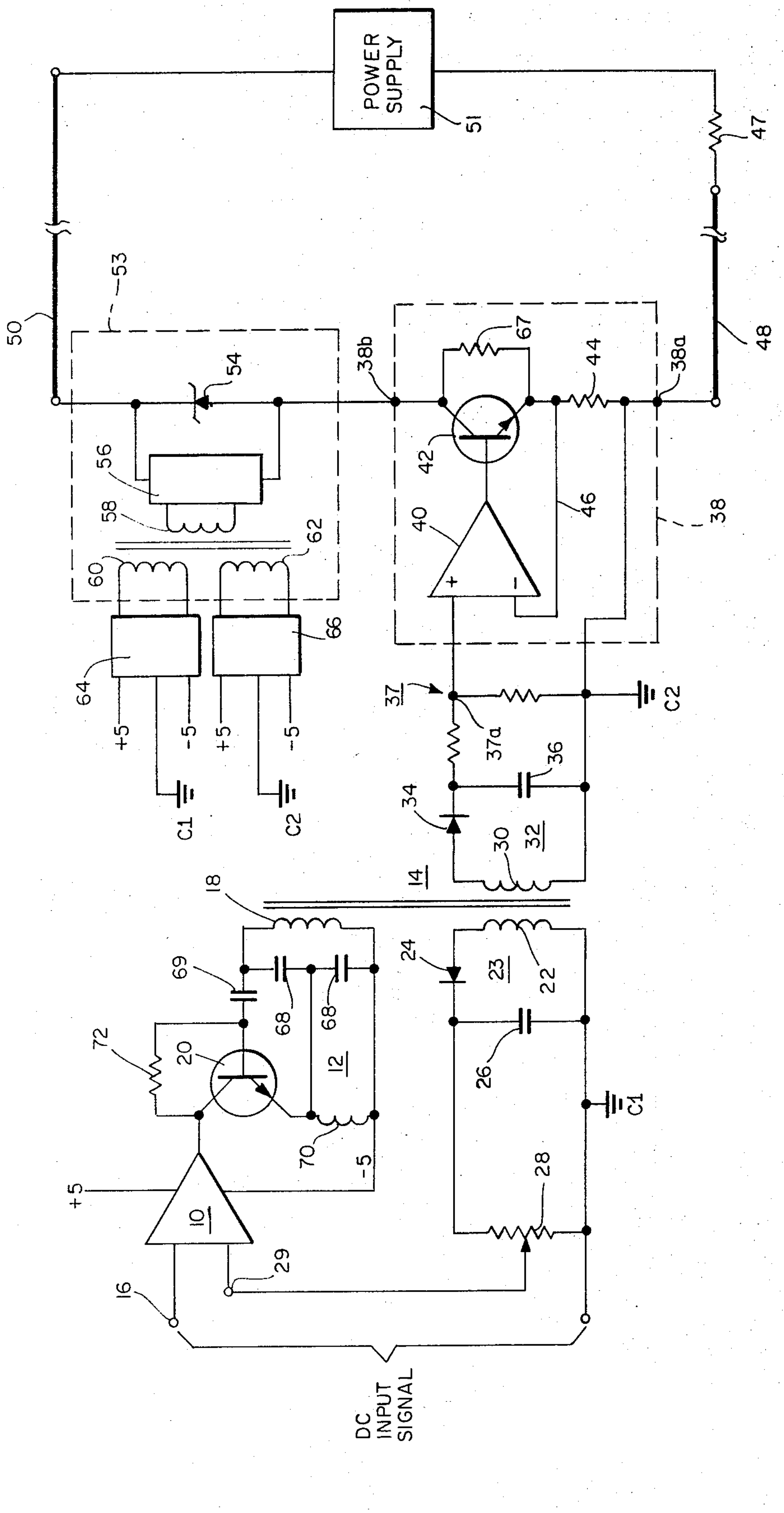
FIG. 1 is a schematic diagram of one preferred embodiment of the invention.

As shown in FIG. 1, the invention is embodied in a DC signal translator comprising an amplifier 10, an oscillator 12 and a DC isolating transformer 14 associated with the oscillator 12. A DC input signal is applied to a first input 16 of the amplifier 10 which modulates a DC output signal which is utilized as the DC supply voltage for the oscillator 12. As the DC supply voltage for the oscillator 12 varies in response to variations to the DC input signal to the amplifier 10, the amplitude of the oscillating signal at the primary or input winding 18, which is DC coupled to the transistor 20 of the oscillator 12, varies.

The transformer 14 also includes a feedback winding 22 which is magnetically coupled to and DC isolated from the primary 18. The primary winding 18 is magnetically coupled to the feedback winding 22 so as to produce an induced voltage across the feedback winding 22 which is directly proportional to the voltage across the primary winding 18 where the constant of proportionality is equal to the turns ratio of the primary winding and the feedback winding. A feedback rectifying means 23 including a diode 24 and a filtering capacitor 26 is connected to the feedback winding 22. A potentiometer 28 permits a portion of the DC signal produced by the rectifying means to be applied to an inverting terminal 29 of the amplifier 10 for comparison with the DC input signal applied to the non-inverting terminal 16. Although not shown, it will be understood that the system input terminals are appropriately biased so as to achieve a DC voltage at the output which exceeds zero for sustaining oscillation of the oscillator 12 when the DC input signal is zero or at the lower end of its range.

The transformer 14 also includes an output winding 30 magnetically coupled to and DC isolated from the primary 18 and the feedback winding 22 for producing an induced voltage across the output winding 30 which is directly proportional to the voltage across the primary 18 where the constant proportionality is equal to turns ratio of the primary winding and the output winding. An output rectifying means 32 including a diode 34 and a filtering capacitor 36 is connected across the output winding 30 so as to generate a DC voltage output signal which is attenuated by a voltage divider 37. In order to achieve a DC output signal equal to the DC feedback signal, the turns ratio of the output winding to the primary winding is made equal to the turns ratio of the feedback winding to the primary winding. For this purpose, the component values and temperature variation from these values for the capacitor 26 and the capacitor 36, the diode 24 and the diode 34, and the potentiometer 28 and the voltage divider 37 are identical or matched. If this identity is not maintained, then other compensating well known in the art must be provided.

The tap 37*a* of the output voltage divider 37 is connected to an output conductance amplifier 38 including an operational amplifier 40 and an amplifier output circuit comprising a transistor 42 with a resistor 44 connected in the emitter circuit. In order to generate a DC current signal through the output terminals 38*a* and 38*b* directly related to the DC voltage signal at potentiometer tap 37*a*, the voltage which is generated across the resistor 44 is fed back through a connection 46 to the inverting terminal of the amplifier 40. If the portion of the DC output voltage signal applied to the non-inverting terminal differs from the DC voltage across the resistor 44, the output from the amplifier 40 drives the transistor 42 in a manner so as to establish a balance between the portion of the DC output voltage signal and the feedback voltage across the resistor 44.

In accordance with one object of the invention, the DC output current signal is applied to a remote load 47 through a two-wire transmission system including a transmission line 48 and a transmission line 50 connected to the output terminals of the conductance amplifier 38. The load 47 is connected in series relationship with a power supply means 51, which may be at the same or another location, and Zener diode 54 which has a constant voltage drop thereacross. A load power supply isolating means 53 includes an oscillator 56 connected across the Zener diode 54 with the output of the oscillator 56 connected to a primary 58 of another DC isolating transformer including secondaries 60 and 62. The secondary 60 powers a DC rectifier-filter 64 for the amplifier 10 shown as having +5, −5 and ciruit common C1 terminals. Similarly, the secondary 62 powers a DC rectifier-filter 66 for the amplifier 40 with +5, −5 and circuit common C2 terminals. In order to establish an initial current through the power supply isolator 53, a shunt resistor 67 is connected between the collector and emitter of the transistor. The shunt resistor 67 may be replaced by constant current circuits well known in the art. By providing the transformer configuration of FIG. 1, it is possible to reference the feedback winding 22 to a potential, e.g., circuit common C1, which differs from the supply voltages of the amplifier 10. This permits the full swing of the amplifier output between a plus and minus 5 volts so as to provide the oscillator with the largest possible voltage change. This in turn permits the transistor 20 of the oscillator 12 to be operable at a higher voltage than would be the case if only half of the supply voltage were utilized. In addition, the larger output signal makes the change in characteristics of the diodes 24 and 34 with temperature and loading less critical.

The embodiment of FIG. 1 is particularly adapted for use with a Colpitts oscillator having a resonant circuit including a primary winding 18, capacitors 68 and 69 and an inductor 70. A bias resistor 72 is connected between the base and collector terminals of the transistor 20.

Figure 2:
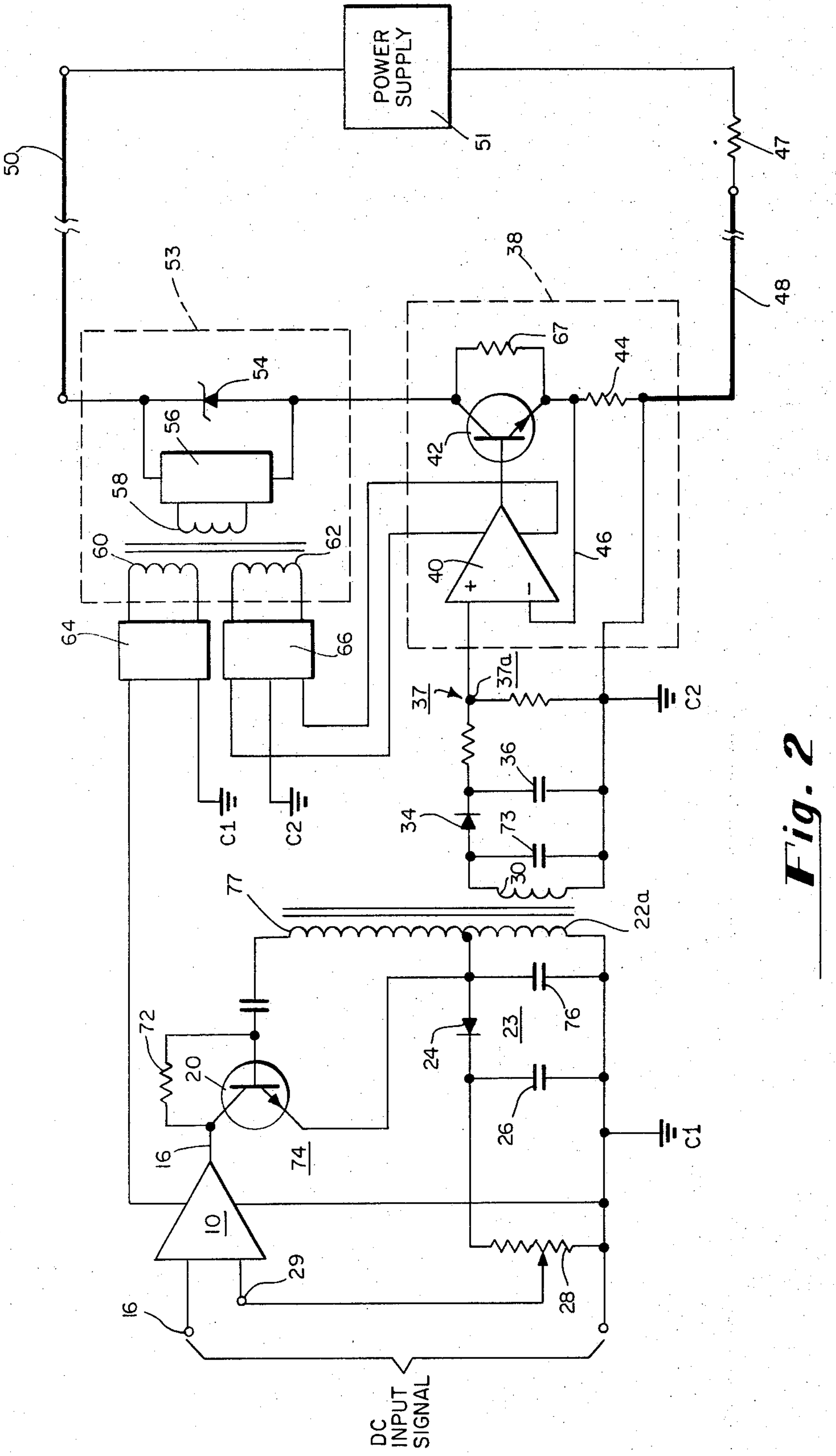
FIG. 2 is a schematic diagram of another embodiment of the invention.

The embodiment of FIG. 2, where identical reference characters are utilized to identify identical circuit elements, is particularly adapted for a Hartley oscillator 74. In the arrangement shown in FIG. 2, the tank circuit of the oscillator 74 includes a capacitor 76 connected in shunt with a portion 22*a* of tank coil 77 of the primary winding 18. In order to assure a DC output signal across the voltage divider 37 which is substantially identical with the DC feedback signal across the potentiometer 28, the feedback circuitry including the capacitor 76 and the portion 22*a* of the primary 77 is matched with the output circuitry including the output winding 30 and the shunt capacitor 78.

In accordance with an important object of the invention, the embodiments of FIG. 1 and FIG. 2 do not require expensive precision components to obtain a DC output signal which closely corresponds with the DC input signal. In accordance with another important object of the invention, the matching of the feedback circuitry with the output circuitry in the embodiment of FIGS. 1 and 2 renders the circuits relatively insensitive to changes in temperature since any effect a change in temperature has on the diode 34 will be matched and cancelled at the diode 24. The same is also true of the output winding 30 and the feedback winding 22 as well as the output winding 30 and the portion 22*a* of the primary 77. The result is a circuit which is relatively immune to zero shift.

The embodiment of FIG. 1 which was considerably simplified for purposes of explanation will now be described in somewhat more detail with reference to FIGS. 3a and 3b. It should be understood that the amplifier 10 which serves as a signal comparison means comprises a combination including an FET chopper circuit 80, an AC amplifier 82, a demodulator 84 and an inverting amplifier 86. The DC input signal and the DC feedback signal are applied to input terminals 16 and 29 which coincide with the channel electrodes of the FET 80*a*. By applying a switching voltage to the control electrode of the FET 80*a*, the difference between the DC input signal and the DC feedback signal is converted into an AC signal for amplification by amplifier 82.

After amplification by the amplifier 82, the AC signal is demodulated by the demodulator 84 which is synchronized by the switching voltage. The resulting DC signal is inverted at the amplifier 86 so as to provide the DC supply voltage for the Colpitts oscillator 12. The oscillator 12 itself is substantially as shown in FIG. 1. An RC combination including a resistor 90 and a capacitor 92 is provided to provide low AC impedance at oscillator-isolator frequency. Capacitor 94 is an AC feedback integrating capacitor around amplifier 86.

The potentiometer 28 which was shown in simplified form in FIG. 1 comprises a coarse span adjustment potentiometer 100 in parallel with a resistor 102 and a fine span adjustment potentiometer 104 having a tap 104*a* connected to circuit common C1 through a resistor 106. Tap 100*a* of the potentiometer 100 is connected to the input terminal 29 through a resistor 108.

The voltage divider 37 comprises a resistor 110 connected to an input terminal of the conductance amplifier 40 and a resistor 112 connected between the input terminal and the circuit common C2. Note that circuit common on one side of the isolating amplifier 14 is referred to as common C1 and circuit common on the other side of the amplifier is referred to as C2 circuit common thereby indicating the DC isolation provided by the transformer 14.

Figure 3A:
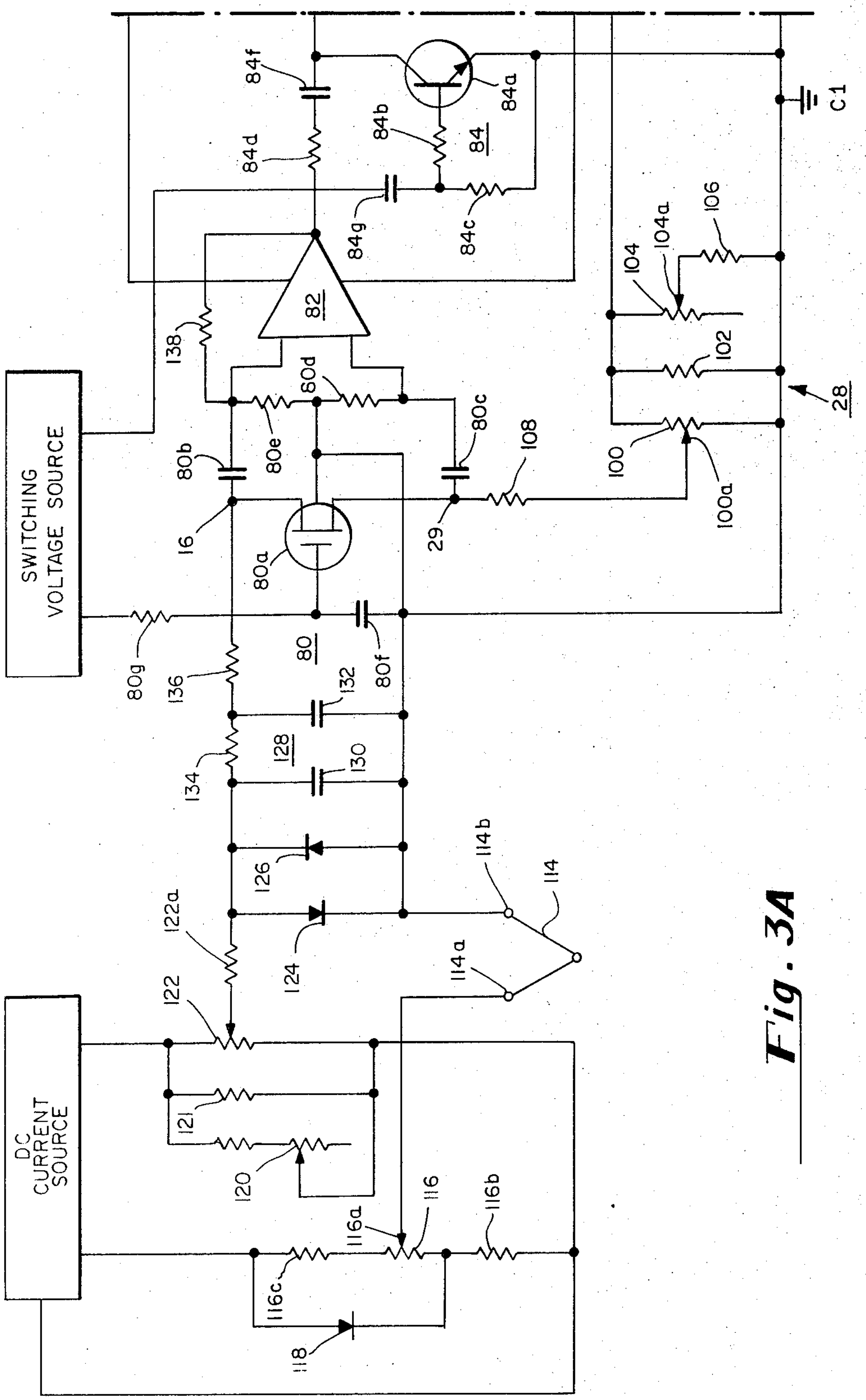
FIGS. 3*a* and 3*b* are schematic diagrams of the embodiment of FIG. 1 showing various circuit details which were not shown in FIG. 1.
Figure 3B:
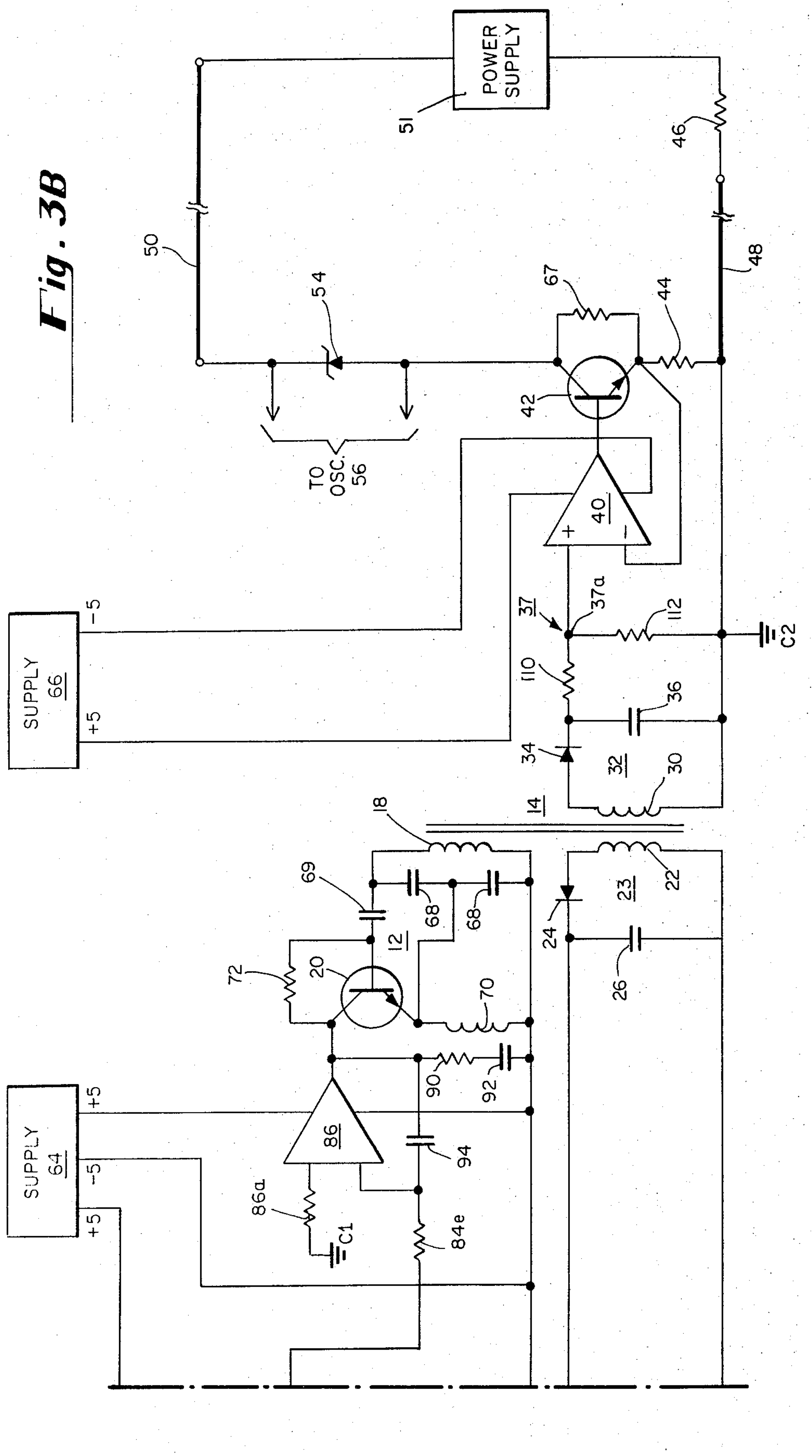

In the specific system of FIGS. 3*a* and 3*b*, the DC input signal represents a control variable in the form of temperature measured by the thermocouple 114. One junction of the thermocouple 114 is electrically connected to a temperature coefficient adjustment potentiometer 116 which is supplied by a suitable DC current source. The tap 116*a* of the potentiometer 116 is connected to one junction 114*a* of the thermocouple 114. A diode 118 is connected in shunt with the potentiometer 116 and thermally connected to reference junctions 114*a* and 114*b* of the thermocouple 114 so as to provide temperature sensitive reference junction compensation. In accordance with techniques well known in the art, a zero adjust circuit including a fine adjustment potentiometer 120, a resistor 121 and a coarse adjustment potentiometer 122 is also provided.

In order to prevent any over-voltage across the transistor 80*a* and the operational amplifier 82, parallel reversely poled diodes 124 and 126 are provided between circuit common C1 and the input terminal 16. In addition, a filter 128 including capacitors 130 and 132 and a resistor 134 are provided. An input resistor 136 in combination with a feedback resistor 138 determines the AC gain of the amplifier 82.

The chopper 80 has not been described in detail. It is however substantially identical to the chopper disclosed in U.S. Pat. No. 3,397,353-Hitt which is assigned to the assignee of this invention and herein incorporated by reference.

The following chart identifies the nature and magnitude of components which may be utilized in building the circuit of FIG. 3:

| | |
|---|---|
| R116 - 500Ω | R102 - 619Ω |
| R116*b* - 150Ω | R104 - 500Ω |
| R116*c* - 15K | R106 - 2K |
| R120 - 500Ω | R84*c* - 47K |
| R121 - 300Ω | R84*d* - 2.2K |
| R122 - 10K | R84*b* - 47K |
| R122*a* - 680Ω | R86*a* - 15K |
| R134 - 680Ω | R84*e* - 15K |
| R136 - 1K | R90 - 39Ω |
| R80*g* - 100K | R72 - 1.5M |
| R80*e* - 100K | R110 - 38.4K |
| R80*d* - 100K | R112 - 4.3K |
| R138 - 15M | R44 - 50Ω |
| R108 - 2.2K | R67 - 6.8K |
| R100 - 10K | R46 - 250Ω |
| C130 - 22μf Sprague 150 D | |
| C132 - 22μf Sprague 150 D | |
| C80*f* - 100pf | |
| C80*b* - 2.2μf tantalum | |
| C80*c* - .82μf tantalum | FET80*a* - 2N4351 |
| C84*g* - 1μf ceramic | T84*a* - 2N3417 |
| C84*f* - 1μf ceramic | T20 - 2N3417 |
| C94 - 5μf non-polar | T42 - 2N4425 |
| C92 - .05μf ceramic | |
| C68 - 2000pf (upper), 820pf (lower) | |
| C26 - .82μf | |
| C36 - .82μf | |
| D118 - 1N914 | AMP82 - CA3078T |
| | (RCA) |
| D124 - 1N816 | AMP86 - 4250 |
| D126 - 1N816 | AMP40 - 4250 |

D-24 - } 1N914
D-34 - } MATCHED PAIR
D-54 - 1N4741A

Figure 4:
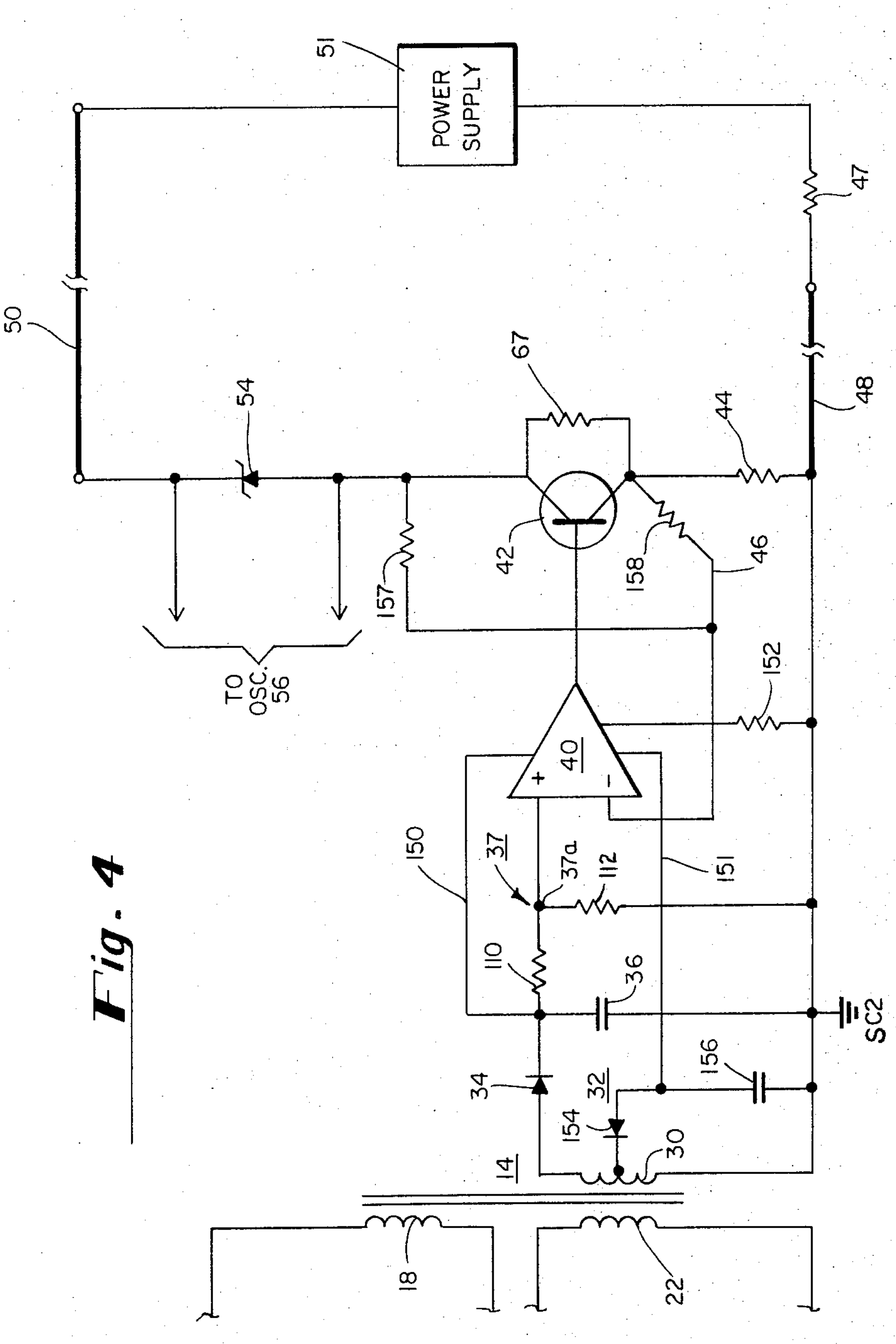
FIG. 4 is a schematic diagram of a preferred output amplifier circuit for the embodiment of FIGS. 1 and 2.

As shown in FIG. 4, the power supply for the operational amplifier 40 is derived from the output winding 30. This is achieved by providing a connection 150 from the junction of the diode 34 and the filter capacitor 36 to a positive supply terminal of the operational amplifier 40 and a connection 151 from the junction of a diode 154 and a filter capacitor 156 to a negative supply terminal of the operational amplifier 40. Alternatively, the diode 154 and the filter capacitor 156 may be eliminated with the connection 151 being made directly to circuit common SC2. The resistor 152 determines the quiescent current from the power supply.

As in the embodiment of FIGS. 3*a* and 3*b*, the output winding 30 as well as the rectifier 34 and the filter capacitor 36 provide an input signal which is obtained from the tap 37*a* of the voltage divider comprising the resistors 110 and 112 which are connected between the diode 34 and circuit common SC2. Thus, the divider or potentiometer comprising the resistors 110 and 112 are connected across the output rectifying means comprising the diodes 34 and 154 so as to apply one portion of the output signal from the winding 30 after rectification by the diode 34 to the one non-inverting terminal of the operational amplifier 40 and another portion of the output signal from the winding 30 after rectification by the diode 34 to the positive power supply terminal of the operational amplifier 40.

The operational amplifier output stage differs from that shown in the embodiment shown in FIGS. 3*a* and 3*b* by the use of a resistor 158 in the feedback path between the emitter of the transistor 42 and the inverting terminal of the operational amplifier 40. In addition, the output stage includes a resistor 157 which is connected between the collector of the transistor 42 and the non-inverting terminal of the operational amplifier. When the load resistor 47 diminishes in resistance value, the voltage drop across both resistors 67 and 44 increases which in turn produces an increase in the feedback signal through the resistor 158 to the non-inverting terminal of the operational amplifier 40 thus causing a reduction in the base bias current to the transistor 42. This reduction in base bias current in turn results in a greater voltage drop between the collector and emitter of the transistor 42. The reduction in base bias current of the transistor 42 also results in the drawing of less current through the connection 150 so as to cause a rise in potential at the junction of the rectifier 34 in the filter capacitor 36 as well as the tap 37*a*. In order to compensate for an undesirable increase in the base current of the transistor 42 due to the rise in potential at the tap 37*a*, a compensating signal is provided through the resistor 157.

Utilizing the output rectifying means as a source of power as well as signals, the operational amplifier 40 need not rely upon the power supply 66. This is advantageous from a cost point as well as eliminating the application of extraneous signals to the operational amplifier 40 which might have an adverse effect on the operation of the signal translator.

Although particular embodiments have been shown and described in the drawings and specification, the appended claims are intended to cover all embodiments and modifications which fall within the true spirit and scope of the invention.

What is claimed is:

1. An oscillator-isolator circuit for obtaining a DC output signal from and corresponding to a DC input signal where DC isolation is maintained between the input and the output of said circuit comprising:

oscillator means including a transistor for generating an oscillating signal having an amplitude varying with a DC supply voltage for said oscillator means;

transformer means associated with said oscillator means, said transformer means including an input winding DC coupled to said transistor and an output winding DC isolated from said transistor;

feedback means coupled to said input winding;

feedback rectifying means DC coupled to said feedback means for deriving a DC feedback signal from said oscillating signal;

amplifier means having an input and an output, said DC feedback signal and said DC input signal being applied to the input of said amplifier means to produce a DC supply signal at the output of said amplifier means related to the difference between said DC feedback signal and said DC input signal, said DC feedback signal controlling said DC supply voltage for said oscillator means; and an output rectifying means DC coupled to said output winding for producing said isolated DC output signal.

2. The circuit of claim 1 wherein said feedback means comprises a feedback winding AC coupled to and DC isolated from said input winding and said output winding.

3. The circuit of claim 2 wherein said feedback winding is matched with said output winding.

4. The circuit of claim 3 wherein feedback rectifying means is matched with said output rectifying means so as to apply a DC feedback signal to said amplifier means which is substantially identical to said DC output signal.

5. The circuit of claim 4 wherein said oscillator means comprises a tank circuit including said input winding and said output winding, a first capacitance connected in parallel with a portion of said input winding and a second capacitance connected in parallel with said output winding.

6. The circuit of claim 5 wherein said input winding and said first capacitance are matched with said output winding and said second capacitance.

7. The circuit of claim 6 wherein said feedback rectifying means and said output rectifying means are matched so as to apply a DC feedback signal to said amplifier means which is substantially identical to said DC output signal.

8. The circuit of claim 1 further comprising:

output amplifier means connected to the output of said output rectifying means, said output amplifier means having first and second output terminals;

DC power supply means;

load means; and power supply isolator means connected in series relationship with said DC power supply means and said load means between said first output terminal and second output terminal of said output amplifier means.

9. The circuit of claim 8 wherein said output amplifier means comprises:

operational amplifier means having a pair of input terminals, an output terminal and at least one power supply terminal;

operational amplifier input means for applying one portion of the output signal from said output rectifying means to one of said operational amplifier input terminals and applying another portion of the output signal from said output rectifying means to said at least one operational amplifier power supply terminal;

an operational amplifier output stage for coupling said operational amplifier output terminal to said load means; and amplifier feedback means for coupling said load means to the other one of said input terminals.

10. The circuit of claim 9 wherein said operational amplifier input means comprises a voltage divider connected across said output rectifying means.

11. The circuit of claim 9 wherein said operational amplifier output stage comprises a transistor having a base terminal connected to said operational amplifier output terminal.

12. The circuit of claim 8 further comprising:

a two-wire transmission means including a first wire connecting said series connected load means and power supply means with said power supply isolator means and a second wire connecting said series connected load means and power supply means with one of said output terminals of said output amplifier.

13. The circuit of claim 8 further comprising:

shunt means connected between said first output terminal and said second output terminal of said output amplifier means for establishing an initial current through said power supply isolator means.

14. The circuit of claim 1 further comprising:

output amplifier means connected to the output of said output rectifying means, said output amplifier means having first and second output terminals;

DC power supply means connected to said first output terminal; and load means connected to said second output terminal and in series with said DC power supply means;

said output amplifier means comprising:

operational amplifier means having a pair of input terminals, an output terminal and at least one power supply terminal;

operational amplifier input means for applying one portion of the output signal from said output rectifying means to one of said operational amplifier input terminals and applying another portion of the output signal from said output rectifying means to said at least one operational amplifier power supply terminal;

an operational amplifier output stage for coupling said operational amplifier output terminal to said load means; and amplifier feedback means for coupling said load means to the other one of said input terminals.

15. A DC signal translator having a DC isolated input and output comprising:

DC signal comparison means having a DC signal input, a feedback input and an output, said signal comparison means generating a DC output signal at said output related to the difference between the signal applied to said DC signal input and said feedback input;

variable amplitude oscillator means having a control input, said output of said comparison means being coupled to said control input of said oscillator means so as to vary the amplitude of the oscillations in response to said DC output signal;

isolating transformer means including an input winding and an output winding associated with said oscillator means, said oscillator means producing DC isolated oscillating signals at said input winding and said output winding;

feedback rectifying means coupled between said transformer means and said feedback input of said signal comparison means so as to obtain a DC feedback signal related to the amplitude of said oscillating signals and apply said DC feedback signal to said feedback input of said signal comparison means; and output rectifying means coupled to said output winding so as to obtain a DC output signal corresponding to said DC input signal.

16. The DC signal translator of claim 15 including output amplifier means coupled to and supplied by said output rectifying means.

17. The DC signal translator of claim 16 wherein said output amplifier means comprises:

operational amplifier means having a pair of input terminals, an output terminal and at least one power supply terminal;

amplifier input means for applying one portion of said DC output signal to one of said operational amplifier input terminals and another portion of the DC output signal to said at least one power terminal;

amplifier output means for coupling said output terminal to a load means; and amplifier feedback means for coupling said load means to the other of said operational amplifier input terminals.

* * * * *